United States Patent [19]

Rush et al.

[11] 4,183,618
[45] Jan. 15, 1980

[54] COUPLINGS AND TERMINALS FOR OPTICAL WAVEGUIDES

[75] Inventors: Derek A. Rush, Emsworth; Anthony J. Thornton, Wembley, both of England

[73] Assignee: Smiths Industries Limited, London, England

[21] Appl. No.: 822,855

[22] Filed: Aug. 8, 1977
(Under 37 CFR 1.47)

Related U.S. Application Data

[63] Continuation-in-part of Ser. No. 779,418, Mar. 18, 1977.

Foreign Application Priority Data

Aug. 6, 1976 [GB] United Kingdom .............. 32817/76

[51] Int. Cl.² ............................................. G02B 5/14
[52] U.S. Cl. ............................. 350/96.18; 350/96.21
[58] Field of Search ....... 350/96 C; 339/205, 255 RT, 339/256 RT

[56] References Cited

U.S. PATENT DOCUMENTS

| | | | |
|---|---|---|---|
| 3,086,190 | 4/1963 | Neidecker et al. | 339/205 |
| 3,825,320 | 7/1974 | Redfern | 350/96 C |
| 3,948,582 | 4/1976 | Martin | 350/96 C |
| 4,062,624 | 12/1977 | Hammer | 350/96 C |
| 4,065,203 | 12/1977 | Goell | 350/96.20 |
| 4,076,376 | 2/1978 | Slaughter | 350/96.21 |

FOREIGN PATENT DOCUMENTS 1429843  3/1976  United Kingdom ................. 350/96 C

*Primary Examiner*—Rolf G. Hille
*Attorney, Agent, or Firm*—Pollock, Vande Sande & Priddy

[57] ABSTRACT

A terminal for an optical waveguide includes a connector having a longitudinal bore in which an end of an optical waveguide is to be anchored, lens means for transmitting light from one end of the waveguide and defining a recess including a focal point of the lens means, and a housing in which the connector and lens means are mounted. The terminal also includes an elongate optical member having first and second ends with respective end faces, the first end of the elongate optical member extending partially through the connector and being anchored therein, and the second end of the elongate optical member being mounted in the recess in the lens means with its end face disposed at the focal point of the lens means. The connector includes means for maintaining the first end of the optical member and an end of an optical waveguide in alignment with one another.

11 Claims, 4 Drawing Figures

U.S. Patent  Jan. 15, 1980  4,183,618
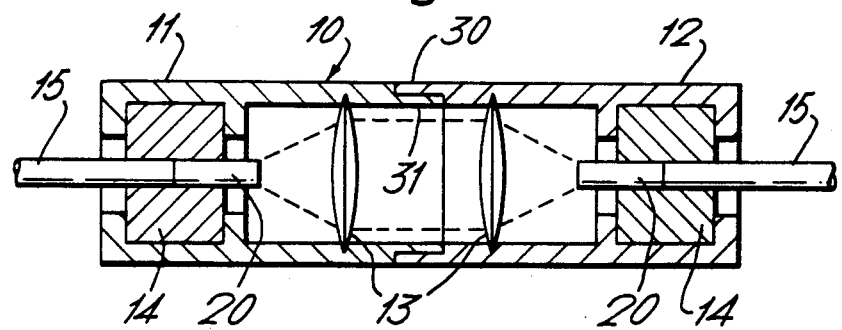
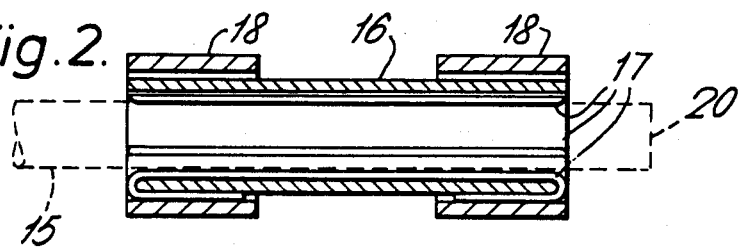
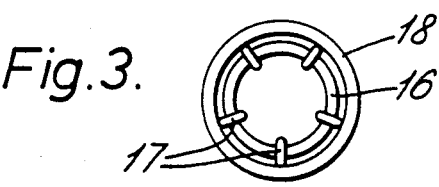
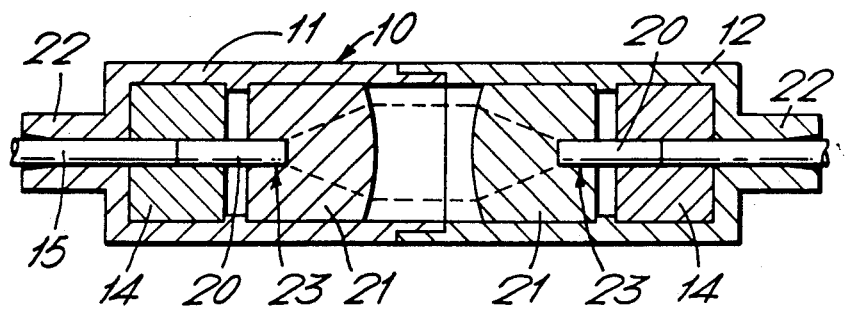

COUPLINGS AND TERMINALS FOR OPTICAL WAVEGUIDES

This application is a continuation-in-part of co-pending application Ser. No. 779,418, filed Mar. 18, 1977, entitled "Couplings and Terminals for Optical Waveguides".

This invention relates to couplings and terminals for optical waveguides.

BACKGROUND OF THE INVENTION

In such couplings it is known to provide a pair of lenses, for example, biconvex or planar-convex lenses, for optically coupling the ends of the optical waveguides. However, in order to provide optimum optical coupling between the waveguides it is necessary accurately to position the waveguides at the focal points of the respective lenses.

This accurate positioning of the ends of the waveguides tends to be rather difficult and time consuming and it is an object of the present invention to provide couplings and terminals for optical waveguides in which the mounting of the waveguides is considerably simplified.

SUMMARY OF THE INVENTION

According to a first aspect of the present invention, there is provided a terminal for an optical waveguide, including a connector having a longitudinal bore in which an end of an optical waveguide is to be anchored, lens means for transmitting light from one end of the waveguide and defining a recess including a focal point of the lens means, and a housing in which the connector and lens means are mounted. The terminal further includes an elongate optical member having first and second ends with respective end faces, the first end of the elongate optical member extending partially through the connector and being anchored therein, and the second end of the elongate optical member being mounted in the recess in the lens means with its end face disposed at the focal point of the lens means. The connector also includes means for maintaining the first end of the optical member and an end of an optical waveguide in alignment with one another.

With such a terminal, the mounting of the optical waveguide in the terminal is simplified considerably, it being necessary merely to insert the end of an optical waveguide into the connector until it engages and is spliced to the first end of the elongate optical member.

According to a second aspect of the present invention, there is provided an optical waveguide terminal including a connector having a longitudinal bore, an optical waveguide having an end disposed in the longitudinal bore, lens means for transmitting light from one end of the waveguide and defining a recess including the focal point of the lens means, and a housing in which the connector and lens means are mounted. The terminal further includes an elongate optical member having first and second ends with respective end faces, the first end of the elongate optical member extending partially through the connector and being optically coupled to the waveguide end while the second end of the elongate optical member is mounted in the recess in the lens means with its end face disposed at the focal point of the lens means. The connector also comprises means for maintaining the first end of the optical member and the waveguide end in alignment with one another.

According to a third aspect of the present invention, there is provided an optical waveguide coupling including a pair of terminals for respective optical waveguides having means to permit the terminals to be optically coupled to, and uncoupled from, one another, each terminal including a connector having a longitudinal bore in which an end of a respective said optical waveguide is to be anchored, lens means for transmitting light from one end of a respective said waveguide and defining a recess including a focal point of that lens means, and a housing in which the respective connector and lens means are mounted. Each terminal further includes an elongate optical member having first and second ends with respective end faces, the first end of each optical member extending partially through the respective connector and being anchored therein and the second end of each optical member being mounted in the recess in the respective lens means with their end faces disposed at the focal points of the lens means. The connectors include means for maintaining the first ends of the optical members in alignment with ends of respective optical waveguides inserted into the connectors.

BRIEF DESCRIPTION OF THE DRAWINGS

Two forms of couplings for optical waveguides comprising a pair of optical waveguide terminals will now be described, by way of example, with reference to the accompanying drawings in which:

FIG. 1 is a sectional side view of a coupling for a pair of optical waveguides as disclosed and claimed in application Ser. No. 779,418;

FIG. 2 is a sectional side view of a connector of the coupling;

FIG. 3 is an end view of the connector; and

FIG. 4 is a sectional side view of a coupling for a pair of optical waveguides in accordance with the present invention.

DETAILED DESCRIPTION OF THE PREFERRED EMBODIMENTS

Referring to FIG. 1, the coupling comprises a pair of optical terminals for optical fibres and includes a tubular housing 10 having two parts 11 and 12. These parts 11 and 12 have, respectively, an annular projection 30 at an end of one part and an annular recess 31 on the other part to receive the annular projection and permit coupling and decoupling of the two parts.

The terminal parts 11 and 12 each house a biconvex lens 13, and a connector 14 for receiving the end of an optical fibre 15 which is to be optically coupled to the lens 13. The connectors 14 are each of the form shown in FIGS. 2 and 3 and include a tube 16 of brass on which is mounted five wires 17 of resilient metal, such as, for example, stainless steel, copper alloy or phosphor bronze, that extend longitudinally through the bore of the tube 16 and are equally spaced around the tube. The wires 17 are tensioned with the ends of the wires being folded over the ends of the tube 16, and clamped to the tube 16 and maintained under tension by rings 18 of, for example, brass or plastics. The wires 17 extend parallel to one another, with the ends of each wire being angularly displaced with respect to one another about the longitudinal axis of the tube 16 so that intermediate portions of the wires 17 are spaced from the inner surface of the tube 16. This angular displacement of the ends of the wires 17 is of the order of 1.5 degrees. The wires 17 extend through slots formed in the ends of the tube 16. With such a connector 14, substantially the whole of the portions of the wires 17 within the tube 16 are slightly spaced from the tube, the degree of such displacement gradually increasing towards the centre of the tube 16 and thereafter gradually decreasing towards the other end of the tube 16. Thus the bore defined in the tube 16 by the wires 17 is of smallest diameter at the centre of the tube. This bore diameter at the centre of the tube 16 is arranged to be slightly smaller than the diameter of the optical fibres so that during insertion of the fibre ends into the connectors 14, the intermediate portions of the wires 17 are deformed outwardly towards the wall of the tube 16 and the wires grip the fibres 15 and thereby axially align the fibres with the connectors 14.

It is necessary accurately to position the ends of the optical fibres at the focal points of the respective lenses 13 and this is achieved by mounting within the connectors 14 respective short lengths 20 of optical fibres having dimensions and optical characteristics substantially identical to the dimensions and optical characteristics of the fibres 15. These fibre lengths 20 are accurately positioned in the connectors 14 prior to the connectors being mounted in the housing 10, with one end of the fibre lengths 20 being positioned midway along the length of the respective connectors while the other ends of the fibre lengths 20 project from one end of the respective connectors by the appropriate distance. The fibre lengths 20 are secured in position by an epoxy adhesive. The connectors 14 are then inserted into the respective ends of the housing parts 11 and 12 remote from the lenses 13 and these ends are then turned over to mount the connectors 14 in the housing parts with the other ends of the fibre lengths 20 being disposed at the focal points of the respective lenses 13.

When it is required to couple a pair of optical fibres 15, it is necessary merely to insert the ends of these fibres into the respective connectors 14 until they abut, and are spliced to, the ends of the respective fibre lengths 20. This simplifies considerably the mounting of the fibres 15.

The fibres 15 secured in the connectors 14 by an epoxy adhesive.

In order to provide the required degree of coupling between the fibres 15, it may be necessary for the ends of the fibre lengths 20 to be highly polished and in these circumstances the ends of the lengths 20 are polished before these lengths are disposed in the connectors 14.

The ends of the fibres 15 may be coated with a fluid having the desired optical characteristics to maximise the optical coupling between these fibres and the fibre lengths 20 before the fibres 15 are inserted into the connectors 14. This fluid is conveniently one which also adhesively bonds the ends of the fibres 15 to the fibre lengths 20.

The single fibres 15 are of very small diameter and in order to assist insertion of these fibres into the connectors 14, the connectors may be shaped to define tapered holes to receive the ends of the fibres. Furthermore, the connectors may be arranged to grip the ends of the fibres 15 firmly so as to prevent withdrawal of the fibre ends from the connectors 14 and thereby maintain the splicing between these fibre ends and the fibre lengths 20.

Referring to FIG. 4, there is shown a similar form of coupling to that shown in FIG. 1 having planar-convex lenses 21 instead of the biconvex lenses 13. These lenses 21 are moulded of plastic, for example, acrylic resin, and have apertures 23 formed therein into which ends of the fibre lengths 20 extend with those ends disposed at the focal points of the respective lenses 21.

It has been found that if the fibres 15 were inserted into the apertures 23, the fibres may not always be a tight fit in these apertures and thus may not be accurately positioned at the focal points of the lenses 21. This is because for any given size of optical fibre the external diameters of the fibres may vary considerably from one fibre to another. It is necessary to provide apertures in the lenses 21 that are capable of receiving the maximum diameter of fibres and thus, when mounting the lenses 21 onto fibres having a relatively small external diameter, difficulties may be experienced in accurately aligning the ends of the fibres in the lenses and accurately locating those ends at the focal points of the lenses. This difficulty is overcome by providing the connectors 14 in the coupling and by accurately mounting the short fibres 20 in the lenses 21 during the assembly of the coupling. Conveniently the fibres selected for providing the short fibres 20 are of the maximum external diameter for that size of fibres so that these fibres are a tight fit in the lens apertures 23 and thus accurately positioned therein. In these circumstances, the fibre lengths 20 are inserted less than half-way through the connectors 14 so as to ensure that even fibres 15 of minimum external diameter inserted into the other ends of the connectors will be gripped by the wires 17 and be properly aligned in the connectors with the short fibres 20.

The fibres 20 are secured in the lenses 21 with an adhesive having the desired optical characteristics.

The housing 10 of FIG. 4 is provided with sleeves 22 to receive the fibres 15, the holes in the sleeves 22 being tapered to facilitate insertion of the fibres 15 into the connectors 14. When the fibres 15 have been inserted into the connectors 14, the sleeves 22 are crimped to the fibres to secure the sleeves of the fibres in position. As before, the ends of the fibres 15 in the connectors 14 are adhesively secured to the short fibres 20.

Various modifications may be made to the embodiments described without exceeding the scope of the invention. For example, the coupling may be for coupling an optical fibre to a light-sensitive device instead of another optical fibre. Also, the single optical fibres 15 and the fibre lengths 20 may be replaced by other optical waveguides or bundles of optical fibres.

We claim:

1. A terminal for an optical waveguide including a connector comprising a generally tubular body and a multiplicity of flexible elongate members mounted on the body, the flexible elongate members being spaced apart around the body and extending longitudinally therethrough to define a longitudinal bore in which an end of an optical waveguide is to be anchored, lens means for transmitting light from one end of the waveguide and defining a recess including a focal point of the lens means, and a housing in which the connector and lens means are mounted, wherein the terminal further includes an elongate optical member having first and second ends with respective end faces, the first end of the elongate optical member extending partially through the longitudinal bore of the connector and being resiliently engaged by the flexible elongate members, and the second end of the elongate optical member being mounted in said recess in the lens means with its said end face disposed at said focal point of the lens means.

2. A terminal according to claim 1, wherein the longitudinal axis of said bore passes through said focal point of the lens means.

3. A terminal according to claim 1, wherein the ends of each of the said flexible elongate members are displaced with respect to one another about the longitudinal axis of the tubular body.

4. A terminal according to claim 3, wherein the ends of each of the flexible elongate members are displaced in the same sense about the longitudinal axis of the tubular body.

5. A terminal according to claim 4, wherein the flexible elongate members extend parallel to one another.

6. A terminal according to claim 1, wherein the flexible elongate members are of circular cross-section.

7. A terminal according to claim 1, wherein the lens means comprises a planar-convex lens.

8. A terminal according to claim 1, wherein the elongate optical member comprises an optical fibre.

9. A terminal according to claim 1, including means for engaging an end of said optical waveguide to anchor an optical waveguide in said connector.

10. An optical waveguide terminal including a connector comprising a generally tubular body and a multiplicity of flexible elongate members mounted on the body, the flexible elongate members being spaced apart around the body and extending longitudinally therethrough to define a longitudinal bore, an optical waveguide having an end disposed in said longitudinal bore, with said flexible elongate member being individually displaced towards the body and resiliently engaging the end of the optical waveguide, lens means for transmitting light from the end of the waveguide and defining a recess including the focal point of the lens means, and a housing in which the connector and lens means are mounted, wherein the terminal further includes an elongate optical member having first and second ends with respective end faces, the first end of the elongate optical member extending partially through the longitudinal bore of the connector with the flexible elongate members resiliently engaging that end and being optically coupled to said waveguide end while the second end of the elongate optical member is mounted in said recess in the lens means with its said end face disposed at said focal point of the lens means.

11. An optical waveguide coupling comprising a pair of terminals for respective optical waveguides having means to permit the terminals to be optically coupled to, and uncoupled from, one another, each terminal including a connector comprising a generally tubular body and a multiplicity of flexible elongate members mounted on the body, the flexible elongate members being spaced apart around the body and extending longitudinally therethrough to define a longitudinal bore in which an end of a respective said optical waveguide is to be anchored, lens means for transmitting light from one end of a respective waveguide and defining a recess including a focal point of that lens means, and a housing in which the respective connector and lens means are mounted, wherein each terminal further includes an elongate optical member having first and second ends with respective end faces, the first end of each optical member extending partially through the longitudinal bore of its respective connector and being resiliently engaged by the flexible elongate members of that connector and the second end of each optical member being mounted in said recess in the respective lens means with their said end faces disposed at said focal points of the lens means.

* * * * *